United States Patent [19]

Udding

[11] Patent Number: 4,935,466

[45] Date of Patent: Jun. 19, 1990

[54] MODIFIED BLOCK COPOLYMERS AND PROCESS FOR THE PREPARATION THEREOF

[75] Inventor: Anne C. Udding, Amsterdam, Netherlands

[73] Assignee: Shell Oil Company, Houston, Tex.

[21] Appl. No.: 196,906

[22] Filed: May 20, 1988

[30] Foreign Application Priority Data

May 21, 1987 [GB] United Kingdom ............... 8711983

[51] Int. Cl.$^5$ ............................................. C08L 53/00
[52] U.S. Cl. .................................. 525/92; 525/332.9; 525/333.5; 525/333.6; 525/343
[58] Field of Search ............. 525/92, 66, 332.9, 333.5, 525/333.6, 343

[56] References Cited

U.S. PATENT DOCUMENTS

| | | | |
|---|---|---|---|
| 3,220,985 | 11/1965 | Breslow | 260/79.3 |
| 4,614,765 | 9/1986 | Dean | 525/332.9 |
| 4,783,503 | 11/1988 | Gergen et al. | 525/66 |
| 4,797,447 | 1/1989 | Gergen et al. | 525/343 |

OTHER PUBLICATIONS

Research Disclosure 1975, vol. 134, p. 44.

*Primary Examiner*—Lewis T. Jacobs

[57] ABSTRACT

A block copolymer comprising a monoalkenylaromatic hydrocarbon block and a hydrogenated conjugated diene hydrocarbon block in which groups

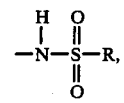

R being an organic radical, are grafted at the aromatic groups, and preparation thereof by reacting the block copolymer with an azide

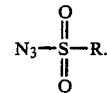

12 Claims, No Drawings

MODIFIED BLOCK COPOLYMERS AND PROCESS FOR THE PREPARATION THEREOF

FIELD OF THE INVENTION

The invention relates to a functionalized, selectively hydrogenated block copolymer comprising at least one block A being at least predominantly a polymerized monoalkenylaromatic hydrocarbon block and at least one block B being, prior to hydrogenation, at least predominantly a polymerized conjugated diene hydrocarbon block, of which block B the ethylenic unsaturation has been reduced by hydrogenation to less than 10% of the original ethylenic unsaturation and of which block A the aromatic unsaturation is above 50% of the original aromatic unsaturation. The invention also relates to a process for the preparation of such functionalized, selectively hydrogenated block copolymers.

BACKGROUND OF THE INVENTION

Block copolymers can be obtained by anionic copolymerization of a conjugated diene and a monoalkenylaromatic hydrocarbon by using an organic alkali metal initiator. These types of block copolymers are diversified in characteristics, ranging from rubber-like characteristics to resin-like characteristics, depending on the content of monoalkenylaromatic compound.

When the content of monoalkenylaromatic compound is small, the produced block copolymer is a so-called thermoplastic rubber. It is a very useful polymer which shows elasticity in the unvulcanized state and is applicable for various uses such as mouldings of shoe sole, impact modifier for polystyrene resins, adhesives and binders.

The block copolymers with a high content of monoalkenylaromatic compound, such as more than 70% by weight, provide a resin possessing both excellent impact resistance and transparency, and such resins are widely used for packaging.

The elastomeric properties of block copolymers also appear to be due in part to their degree of branching. While the polymers of monoalkenylaromatic hydrocarbons have a basic straight carbon chain backbone, those with elastomeric properties always have pending alkyl radicals. For example, ethylene-propylene rubber has a structure of pending methyl radicals which appears to provide elasticity and other elastomeric properties, such as high elongation and high tensile strength.

Block copolymers have been produced, see U.S. patent specification Re 27,145 which comprise primarily those having the general structure A-B-A wherein the two terminal polymer blocks A comprise thermoplastic polymer blocks of vinylarenes, such as polystyrene, while block B is a polymer block of a selectively hydrogenated conjugated diene. The proportion of the thermoplastic terminal blocks to the center elastomeric polymer block and the relative molecular weights of each of these blocks is balanced to obtain a rubber having an optimum combination of properties such that it behaves as a vulcanized rubber without requiring the actual step of vulcanization. Moreover, these block copolymers can be designed not only with this important advantage but also so as to be handled in thermoplastic forming equipment and are soluble in a variety of relatively low cost solvents.

The selective hydrogenation has rendered the block copolymers less sensitive to oxidation and may be effected selectively as disclosed in U.S. patent specification Re 27,145. These polymers are hydrogenated block copolymers having a configuration, prior to hydrogenation of A-B-A wherein each of the A blocks is an alkenyl-substituted aromatic hydrocarbon polymer block and B is a butadiene polymer block wherein 35–55 mol per cent of the condensed butadiene units in the butadiene polymer block have 1,2-configuration.

These selectively hydrogenated ABA block copolymers are deficient in many applications in which adhesion is required due to its hydrocarbon nature. Examples include the toughening and compatibilization of polar polymers such as the engineering thermoplastics, the adhesion to high energy substrates of hydrogenated block copolymer elastomer based adhesives, sealants and coatings and the use of hydrogenated elastomer in reinforced polymer systems. However, the placement onto the block copolymer of functional groups which can provide interactions not possible with hydrocarbon polymers solves the adhesion problem and extends the range of applicability of this material.

Beyond the very dramatic improvement in interface adhesion in polymer blends, a functionalized S-EB-S component can also contribute substantially to the external adhesion characteristics often needed in polymer systems. "EB" refers to the selectively hydrogenated butadiene block which is referred to as "ethylene-butylene". These include adhesion to fibers and fillers which reinforce the polymer system; adhesion to substrates in adhesives, sealants, and coatings based on functionalized S-EB-S polymers, adhesion of decorations such as printing inks, paints, primers, and metals of systems based on S-EB-S polymers; participation in chemical reactions such as binding proteins such as heparin for blood compatibility; surfactants in polar-non-polar aqueous or non-aqueous dispersions.

Functionalized S-EB-S polymer can be described as basically commercially produced S-EB-S polymers which are produced by hydrogenation of styrene-butadiene-styrene (S-B-S) block copolymer to which is chemically attached to either the styrene or the ethylenebutylene block, chemically functional moieties.

Functionalized, selectively hydrogenated block copolymers of the type described hereinbefore have now been found which, compared with the corresponding non-functionalized selectively hydrogenated block copolymers have a higher tensile strength and a higher elongation at break, both in particular at elevated temperature; moreover, they show the improvements described hereinbefore with respect to the known functionalized, selectively hydrogenated block copolymers.

SUMMARY OF THE INVENTION

Accordingly, the invention provides a functionalized, selectively hydrogenated block copolymer comprising at least one block A being at least predominantly a polymerized monoalkenylaromatic hydrocarbon block and at least one block B being, prior to hydrogenation, at least predominantly a polymerized conjugated diene hydrocarbon block, of which block B the ethylenic unsaturation has been reduced by hydrogenation to less than 10% of the original ethylenic unsaturation and of which block A the aromatic unsaturation is above about 50% of the original aromatic unsaturation, in which groups of the general formula I

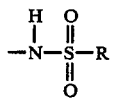

$$\begin{matrix} H & O \\ | & \| \\ -N-S-R \\ & \| \\ & O \end{matrix} \quad (I)$$

in which R represents an organic radical, are substantially grafted at aromatic groups in the blocks A.

DETAILED DESCRIPTION OF THE INVENTION

Block copolymers of conjugated dienes and vinylaromatic hydrocarbons which may be utilized include any of those which exhibit elastomeric properties and those which have 1,2-microstructure contents prior to hydrogenation of from about 7% to about 100%. Such block copolymers may be multiblock copolymers of varying structures containing various ratios of conjugated dienes to monoalkenylaromatic hydrocarbons including those containing up to 60 per cent by weight of monoalkenylaromatic hydrocarbon. Thus, multiblock copolymers may be utilized which are linear or branched, which includes graft, radical or star configurations, depending upon the method by which the block copolymer is formed. Branched configurations may be either symmetrical or asymmetrical with respect to the blocks radiating from the residual group of a polyfunctional coupling agent having two or more functional groups. Examples of such multiblock copolymers may have structures represented by the formulate A-B, A-B-A, A-B-A-B, B-A, B-A-B, B-A-B-A, (AB)$_{0,1,2}$...BA and the like wherein A is a polymer block of a monoalkenylaromatic hydrocarbon or a conjugated diene/-monoalkenylaromatic hydrocarbon tapered copolymer block and B is a polymer block of a conjugated diene. The block copolymer preferably has the general formula $B_n(AB)_o A_p$ wherein n=0 or 1, o=0 or an integer of at least 1 and p=0 or 1, in which not more than one of n, o or p are equal to zero. Particularly preferred are block copolymers having at least one mid block B and at least two end blocks A. Diblock copolymers AB are also very suitable. Suitably, the blocks A comprise from about 5 to about 95 percent by weight, preferably about 5 to about 35 percent and more preferably from about 5 to about 30 percent by weight of the block copolymer.

The block copolymers may be produced by any well-known block polymerization or copolymerization procedures including the well-known sequential addition of monomer techniques, incremental addition of monomer technique or coupling technique as illustrated in, for example, U.S. Pat. Nos. 3,251,905; 3,390,207; 3,598,887 and 4,219,627, the disclosures of which are herein incorporated by reference. As is well known in the block copolymer art, tapered copolymer blocks can be incorporated in the multiblock copolymer by copolymerizing a mixture of conjugated diene and alkenylaromatic hydrocarbon monomers utilizing the difference in their copolymerization reactivity rates. Various patent specifications describe the preparation of multiblock copolymers containing tapered copolymer blocks including U.S. Pat. Nos. 3,251,905; 3,265,765; 3,639,521 and 4,208,356, the disclosures of which are herein incorporated by reference.

Thus, it will be understood that both blocks A and B may be either homopolymer, random or tapered copolymer blocks as long as each block at least predominates in at least one class of the monomers characterizing the respective polymer block, for example greater than 50%, preferably from about 80% to about 100%, more preferably 100% by weight of the characterizing class of monomers.

Conjugated dienes which may be utilized to prepare the polymers and copolymers are those having from 4 to 8 carbon atoms per molecule and include, for example, 1,3-butadiene, 2-methyl-1,3-butadiene(isoprene), 2,3-dimethyl-1,3-butadiene, 1,3-pentadiene and 1,3-hexadiene. Mixtures of such conjugated dienes may also be used. The preferred conjugated diene is 1,3-butadiene.

Alkenylaromatic hydrocarbons which may be utilized to prepare copolymers include vinylaromatic hydrocarbons, such as styrene, o-methylstyrene, p.methylstyrene, p-tert-butylstyrene, 1,3-dimethylstyrene, alpha-methylstyrene, vinylnaphthalene and vinylanthracene. The preferred vinylaromatic hydrocarbon is styrene.

According to a preferred embodiment of the present invention the block copolymer is a styrene-butadiene-styrene block copolymer. The polymerized styrene blocks preferably have an average molecular weight from about 2,000 to about 115,000, more preferably from about 4,000 to about 60,000 and the polymerized butadiene blocks preferably have an average molecular weight from about 20,000 to about 450,000, more preferably from about 35,000 to about 150,000. Suitably, in the range from about 35 to about 55 mol % and preferably from about 40 to about 50 mol % of the condensed butadiene units in block B have a 1,2-configuration. Preferably, an average of less than about 25% and more preferably less than about 10% of the blocks A are hydrogenated.

It should be observed that the above-described polymers and copolymers may, if desired, be readily prepared by the methods set forth hereinbefore. However, since many of these polymers and copolymers are commercially available, it is usually preferred to employ the commercially available polymer as this serves to reduce the number of processing steps involved in the overall process. The hydrogenation of these polymers and copolymers may be carried out by a variety of well-established processes including hydrogenation in the presence of such catalysts as Raney Nickel, noble metals of Group 8 of the Periodic Table of the Elements, such as platinum and palladium, and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Specifications Re 27,145; 3,113,986; 3,700,633; 3,700,748; 3,763,044; 3,772,196; 3,965,019; 4,036,910; and 4,226,952, the disclosures of which are herein incorporated by reference. The polymers and copolymers are hydrogenated in such a manner as to produce hydrogenated polymers and copolymers having a residual ethylenic unsaturation content in the polydiene block of less than about 10 percent, preferably less than about 5 percent and more preferably at most about 2 percent of their original ethylenic unsaturation content prior to hydrogenation.

The organic radical represented by R in the general formula I is preferably an aromatic group and, more preferably, a phenyl group. Other examples of groups R are naphthyl and anthryl groups. R may further represent a cycloalkyl group, for example a cyclobutyl, cyclopentyl or cyclohexyl group, or an alkyl group, for example a pentyl, hexyl, heptyl, octyl, nonyl or decyl group. According to a preferred embodiment of the present invention R represents an organic radical containing a carboxyl group, in particular a 3-carboxyphenyl or a 4-carboxyphenyl group; very good results have been obtained with 3-carboxyphenyl groups.

The organic radical R in the general formula I may contain substituents other than carboxyl groups, either in the presence or in the absence of carboxyl groups. Examples of such substituents are halogen atoms, i.e. fluorine, chlorine, bromine or iodine atoms; cyano groups; hydroxyl groups; dialkylamino groups; nitro groups or benzoyl groups. Aromatic groups represented by R may carry, for example, an alkyl or a cycloalkyl group and alkyl groups represented by R may carry, for example, an aromatic or a cycloalkyl group. It is not excluded that R represents a heterocyclic group, for example a 2-thienyl, a 3-thienyl, a 2-furyl, a 3-furyl, a 2-pyridyl, a 3-pyridyl or a 4-pyridyl group or a group obtained by hydrogenation of each of these seven groups. Specific examples of groups R are 3-carboxy-4 hydroxyphenyl, 3-carboxy-4 chlorophenyl, 4-(carboxymethoxy)phenyl, 3,4-dicarboxyphenyl, 5-carboxynaphthyl, 2-neopentyl-5-carboxyphenyl and 2-ethyl-5-carboxyphenyl groups.

The invention further provides a process for the preparation of a functionalized, selectively hydrogenated block copolymer as described hereinbefore which process comprises reacting a selectively hydrogenated block copolymer comprising at least one block A being at least predominantly a polymerized monoalkenylaromatic hydrocarbon block and at least one block B being, prior to hydrogenation, at least predominantly a polymerized conjugated diene hydrocarbon block, of which block B the ethylenic unsaturation has been reduced by hydrogenation to less than about 10% of the original ethylenic unsaturation and of which block A the aromatic unsaturation is above about 50% of the original aromatic unsaturation, with an azide having the general formula II

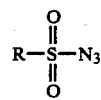   (II)

in which R has the same meaning as in the general formula I. An example of such an azide is 3-azidosulphonylbenzoic acid, which may be prepared by any convenient method such as the method disclosed in U.S. Pat. No. 4,666,631, the disclosure of which is hereby incorporated by reference.

It has, surprisingly, been found that the process according to the present invention results in substantially grafting the groups of the general formula I selectively (i.e., preferentially) to the aromatic groups in the blocks A. At least about 70% of the grafted groups are grafted to the blocks A.

The process according to the present invention is preferably carried out by heating an admixture of the selectively hydrogenated block copolymer and an azide of the general formula II to a temperature in the range of from about 100° C. to about 300° C. and more preferably from about 150° C. to about 250° C.

The azide of the general formula II may be admixed with the block copolymer in any suitable manner, for example in a powder mixer or, in a melt on a conventional rubber mill, or in an internal mixer, or in an extruder such as a Brabender mixer.

In addition to the azide, other ingredients can also be incorporated, for example fillers, extenders, pigments, stabilizers and plasticizers. If desired, the process according to the present invention may be carried out in the presence of a radical scavenger (primary antioxidant) and/or a peroxide decomposer (a secondary antioxidant) to prevent any degradation of aliphatic carbon carbon bonds in the block copolymer. Examples of radical scavengers are sterically hindered phenols such as "Ionox 220", a trade mark for 4,4'-methylene-bis-2,6-ditertiary butylphenol and "Ionox 330", a trade mark for 1,3,5-trimethyl-2,4,6-tris(3,5-di-tert-butyl-4-hydroxybenzyl) benzene.

The following Examples further illustrate the invention. The experiments were carried out with Polymer I which is a selectively hydrogenated block copolymer ABA in which "A" is a styrene block having an average molecular weight of about 7500 and "B" is a hydrogenated polybutadiene block having an average molecular weight of about 37,000 and having an ethylenic unsaturation of less than 5% of its original value and an aromatic unsaturation of at least 95% of its original value.

EXAMPLE 1

A mixture of powdered Polymer I (50 g) and 3-azidosulphonylbenzoic acid (2 g) was fed to a Brabender mixer provided with kneading screws and having a temperature of 190° C. at the start and 210° C. at the end of the reaction. The mixer was used at a speed of 30 revolutions per min (rpm). The styrene blocks and the ethylene-butylene blocks in Polymer I had a molecular weight of 7,500 and 37,000, respectively. The residence time of the material in the mixer was 5 min. NMR analysis showed that 80% of the 3-azidosulphonylbenzoic acid was grafted to the block copolymer and that 80% thereof was grafted to the aromatic groups. The modified block copolymer is referred to Polymer II.

The material withdrawn from the mixer (Polymer II) was allowed to adopt ambient temperature and was subsequently heated for 15 min in a mould at 185° C. to prepare test sheets having dimensions of 11.5×11.5×0.1 cm and wherefrom test specimen having dimensions according to DIN 53,504, type S3A were prepared. The tensile strength and elongation at break at 23° C. and 70° C. and moduli at 70° C. were determined according to method ISO R527, using a strain rate of 200 mm per min. These properties were also determined for the starting Polymer I. Table I hereinafter presents the results.

TABLE I

| | Tensile Strength, MPa | | Elongation at break, % | | Modulus at 70° C., MPa, at | |
|---|---|---|---|---|---|---|
| | 23° C. | 70° C. | 23° C. | 70° C. | 300% | 500% |
| Polymer I | 31.0 | 3.2 | 500 | 525 | 2.6 | 3.1 |
| Polymer II | 35.0 | 4.2 | 617 | 750 | 2.9 | 3.7 |

The table shows that the process according to the invention had resulted in an increase of the tensile strength at 23° C. and at 70° C. of 13% and 31%, respectively, and in an increase of elongation at break at 23° C. and at 70° C. of 23% and 43%, respectively.

EXAMPLE 2

Powdered Polymer I (50 g) was heated in the Brabender mixer, at a speed of 30 rpm, to a temperature of 145° C. and at this temperature 3-azidosulphonylbenzoic acid (2 g) was added. The temperature of the mixture thus obtained was increased to 190° C. in a period of 3 min and then increased from 190° C. to 210° C. in four min. The modified block copolymer is referred to as Polymer III.

The material withdrawn from the mixer (Polymer III) was allowed to adopt ambient temperature and was subsequently heated for 15 min in a mould at (185° C. to prepare test sheets. The tensile strength, the elongation at break and the moduli at 70° C. were the same as those of Polymer II indicated in Table I hereinbefore.

EXAMPLE 3

A repeat of Example 1 was performed to obtain Polymer IV which was in turn utilized to prepare a zinc ionomer thereof (Polymer V) with an excess of zinc oxide (2 part per hundred rubber (Polymer I) ZnO). Again about 80% of the 3-azidosulphonyl-benzoic acid was grafted to the block copolymer and presumably 80% thereof was grafted to the aromatic groups thereof. Test specimens were prepared according to the procedure of Example 1 and tested in a similar manner, except that 20 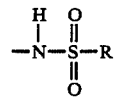C was utilized rather than 23° C. Table II hereinafter presents the results.

TABLE II

| | Tensile Strength, MPa | | Elongation at break, % | | Modulus at 70° C., MPa |
|---|---|---|---|---|---|
| | 20° C. | 70° C. | 20° C. | 70° C. | at 300% |
| Polymer I | 34 | 3.2 | 500 | 525 | 2.6 |
| Polymer IV | 35 | 4.3 | 593 | 700 | 2.9 |
| Polymer V | 32 | 4.5 | 595 | 700 | 2.8 |

Additionally, dynamic mechanical measurements (scanning over a wide temperature range) have indicated that the glass transition temperature (Tg) of the styrene blocks of Polymers IV and V are about 20° C. higher than the Tg of the unmodified polymer, Polymer I, which is in accordance with the improved tensile properties at 70° C. of the former materials (Polymers IV and V).

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

What is claimed is:

1. A functionalized, selectively hydrogenated block copolymer comprising at least one block A being at least predominantly a polymerized monoalkenyl aromatic hydrocarbon block and at least one block B being, prior to hydrogenation, at least predominantly a polymerized $C_4$ to $C_8$ conjugated diene hydrocarbon block and having a 1,2-microstructure content of from about 7% to about 100%, of which block B the ethylenic unsaturation has been reduced by hydrogenation to less than about 10% of the original ethylenic unsaturation and of which block A the aromatic unsaturation is above about 50% of the original aromatic unsaturation, the functionalized, selectively hydrogenated block copolymer comprising 60% by weight or less monoalkenyl aromatic hydrocarbon monomer units, in which 70% or more of groups of the general formula I $$\begin{array}{c} H \quad O \\ | \quad \| \\ -N-S-R \\ \| \\ O \end{array}$$

are grafted in the blocks A, and in which R represents an organic radical selected from the group consisting of aromatic, cycloalkyl, hetrocyclic and alkyl radicals.

2. The block copolymer according to claim 1, wherein the blocks A have an average molecular weight in the range of from about 2,000 to about 115,000 and blocks B from about 20,000 to about 450,000.

3. The block copolymer according to claim 1, wherein the block copolymer has at least one mid block B and at least two end blocks A.

4. The block copolymer according to claim 1, wherein the blocks A comprise in the range of from about 5 to about 35% by weight of the block copolymer and the ethylenic unsaturation of block B has been reduced to less than about 5% of its original value.

5. The block copolymer according to claim 1, wherein block A is a polystyrene block and block B, prior to hydrogenation, is a polybutadiene block.

6. The block copolymer according to claim 1, wherein R in the general formula I represents a substituted phenyl group.

7. The block copolymer according to claim 6, wherein R in the general formula I represents a 3-carboxyphenyl group.

8. The block copolymer according to claim 1, wherein the groups of the general formula I are present in an amount in the range of from about 0.1 to about 20 % by weight, calculated on the functionalized, selectively hydrogenated block copolymer.

9. A process for the preparation of a functionalized, selectively hydrogenated block copolymer which process comprises the steps of reacting a selectively hydrogenated block copolymer comprising at least one block A being at least predominantly a polymerized monoalkenyl aromatic hydrocarbon block and at least one block B being, prior to hydrogenation, at least predominantly a polymerized $C_4$ to $C_8$ conjugated diene hydrocarbon block, of which block B the ethylenic unsaturation has been reduced by hydrogenation to less than about 10% of the original ethylenic unsaturation and of which block A the aromatic unsaturation is above 50% of the original aromatic unsaturation, the selectively hydrogenated block copolymer comprising 60% by weight or less monoalkenyl aromatic hydrocarbon monomer units, with an azide having the general formula II

in which R represents an organic radical selected from the group consisting of aromatic, cycloalkyl, hetrocyclic and alkyl radicals.

10. A process according to claim 9, wherein the process is carried out at a temperature in the range of from about 100° C. to about 300° C.

11. The block copolymer according to claim 1 wherein R in the general formula I is substituted with a substituent selected from the group consisting of halogen, cyano groups, hydroxyl groups, dialkylamino groups, nitro groups, benzoyl groups, and a combination of one of the preceding and carboxyl groups.

12. The block copolymer according to claim 7 wherein R in the general formula I is substituted with a substituent selected from the group consisting of halogen, cyano groups, hydroxyl groups. dialkylamino groups, nitro groups, benzoyl groups, and a combination of one of the preceding and carboxyl groups.

* * * * *